United States Patent [19]

Peed

[11] 4,061,926
[45] Dec. 6, 1977

[54] WIND DRIVEN ELECTRICAL GENERATOR

[76] Inventor: Paul V. Peed, 1053 North Ave., Sacramento, Calif. 95838

[21] Appl. No.: 669,961

[22] Filed: Mar. 24, 1976

[51] Int. Cl.$^2$ .......................... F03D 9/00; H02P 9/04
[52] U.S. Cl. ................................................. 290/55
[58] Field of Search ................ 290/43, 44, 54, 55; 415/2, 3, 4; 308/221, 230

[56] References Cited

U.S. PATENT DOCUMENTS

| 3,697,765 | 10/1972 | Carini | 290/44 |
| 3,938,907 | 2/1976 | Magoveny et al. | 415/4 |
| 3,974,396 | 8/1976 | Schonball | 290/54 |

Primary Examiner—Robert K. Schaefer
Assistant Examiner—Eugene S. Indyk
Attorney, Agent, or Firm—Blair & Brown

[57] ABSTRACT

An electric generating system in which oppositely rotating wind driven wheels are used, one to drive the rotor and one to drive the stator of an electric generator.

2 Claims, 7 Drawing Figures

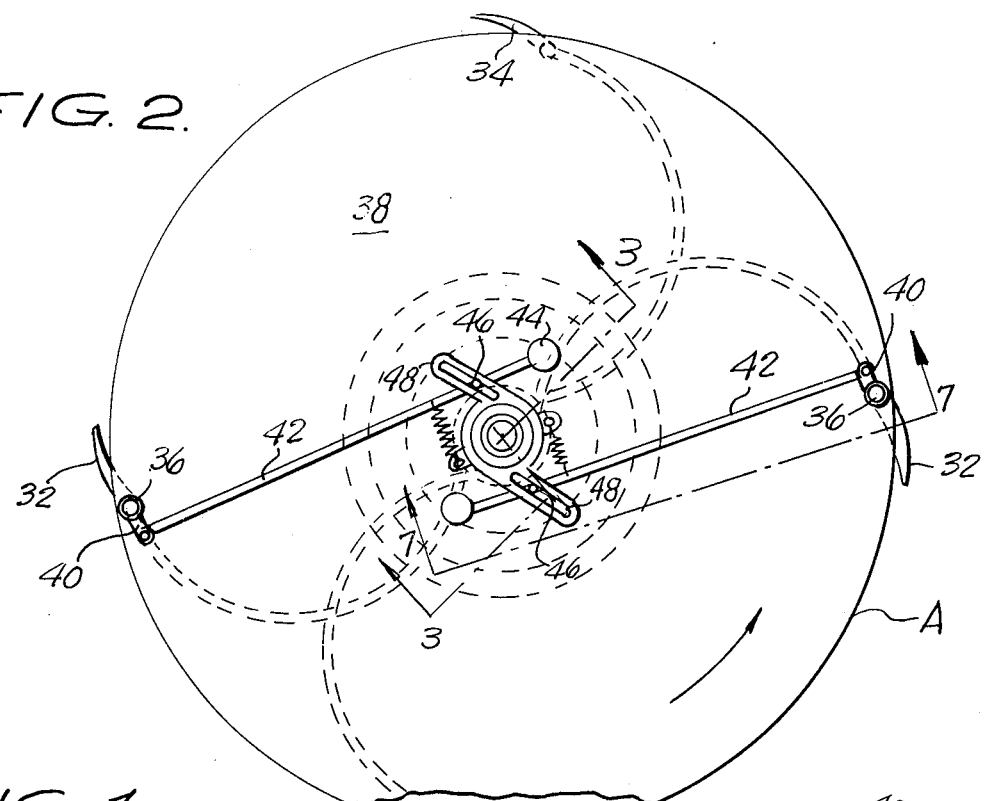
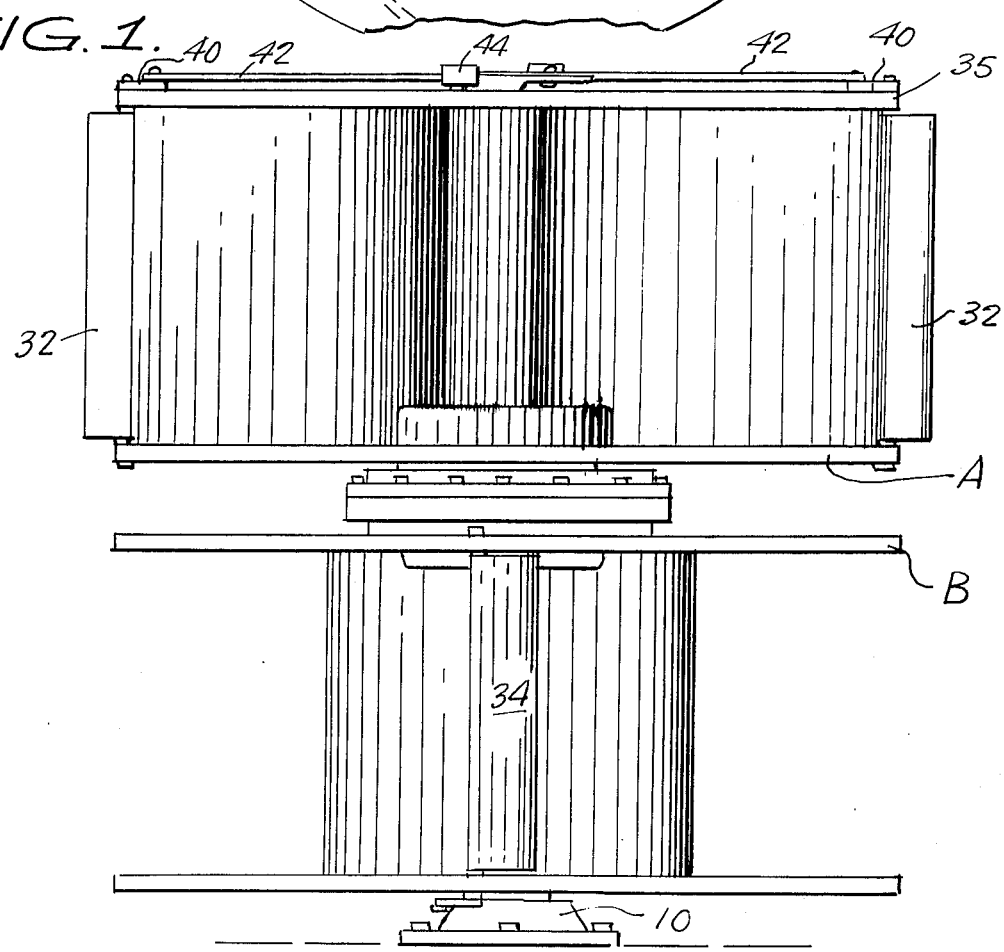

WIND DRIVEN ELECTRICAL GENERATOR

BACKGROUND OF THE INVENTION

1. FIELD OF THE INVENTION
2. SUMMARY OF THE INVENTION

In isolated areas and other places where it is desired to produce electricity locally it has been the custom to use small diesel or gasoline engines to drive electric generators. Such engines, however, use fuel which is in short supply and is also costly. Windmills have been suggested for driving generators but have not been entirely satisfactory due to the speed requirements for the generator, and mechanical problems of adjusting the direction of the windmill and gearing to increase the rotational speed of rotation from the rotor speed to the shaft of the generator.

It is an object of the present invention to provide a wind driven generator installation not requiring gearing, and not requiring adjustment due to changes of wind direction.

Other objects and advantages will become apparent in the following specification when considered in light of the attached drawings.

BRIEF DESCRIPTION OF THE DRAWINGS

FIG. 1 is an elevation of the device;

FIG. 2 is a plan view of the device showing speed regulating means;

DESCRIPTION OF THE PREFERRED EMBODIMENT

Figure 3:
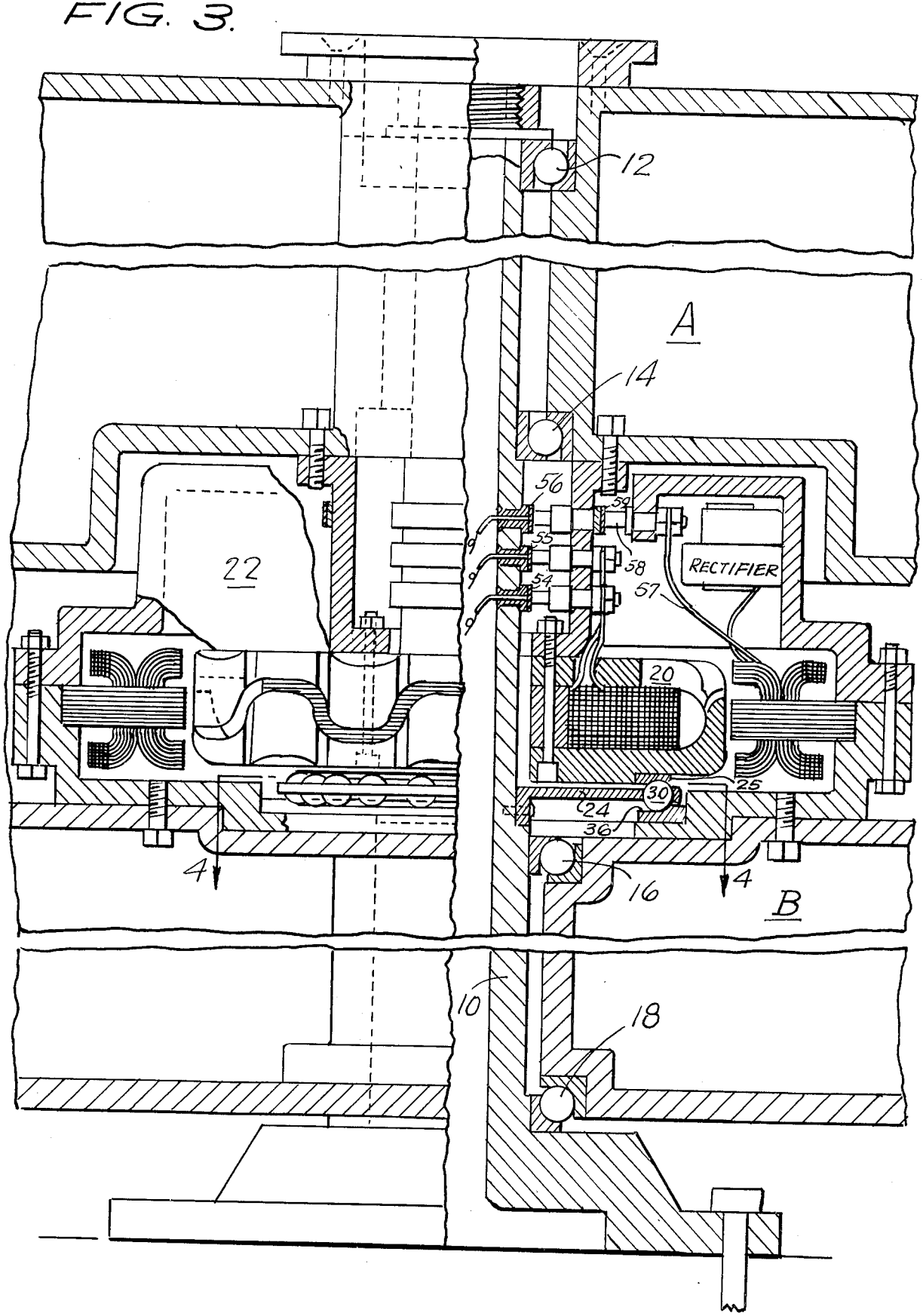
FIG. 3 is a fragmentary section of FIG. 1.

As seen in FIG. 1 the device comprises two wind driven turbines ("Savonius" turbines) A and B having radially extending vanes mounted coaxially one above the other on a tubular stationary post-like support 10 as seen also in FIG. 3. These turbines are of the type comprising a plurality of concave buckets all facing in the same direction in a dynamically symmetrical arrangement so that as the wind blows past the turbine it will be entrapped in the concave side of one bucket but will be deflected by the convex side of the diametrically positioned bucket. Since the buckets of the two said turbines face the opposite directions, wind flowing past the superimposed turbines will rotate the turbines in opposite directions.

The two turbines will be spaced axially a distance to minimize loss of power due to air friction caused by the turbulence surrounding the turbines in use.

In FIGS. 1 and 2 turbine A will rotate counterclockwise looking down on the device, and turbine B will rotate clockwise.

Referring to FIG. 3, turbine A is mounted for easy rotation on bearing 12 and 14 on post or column 10. Turbine B is similarly mounted for support and easy rotation on bearings 16 and 18 on column 10.

A rotor element 20 of an electric generator is mounted on the lower side of turbine A to be rotated by turbine A and is positioned between the two turbines. A stator element 22 is mounted on the upper surface of turbine B to be rotated by turbine B and to surround the rotor 20.

It will appear then that as turbine A rotates rotor 20 at perhaps 150 rpm counterclockwise, and turbine B rotates stator 22 at, say, 150 rpm clockwise, the relative speed of rotation between the rotor and stator will be 300 rpm which could not be attained by a single such turbine without the use of gearing.

Figure 4:
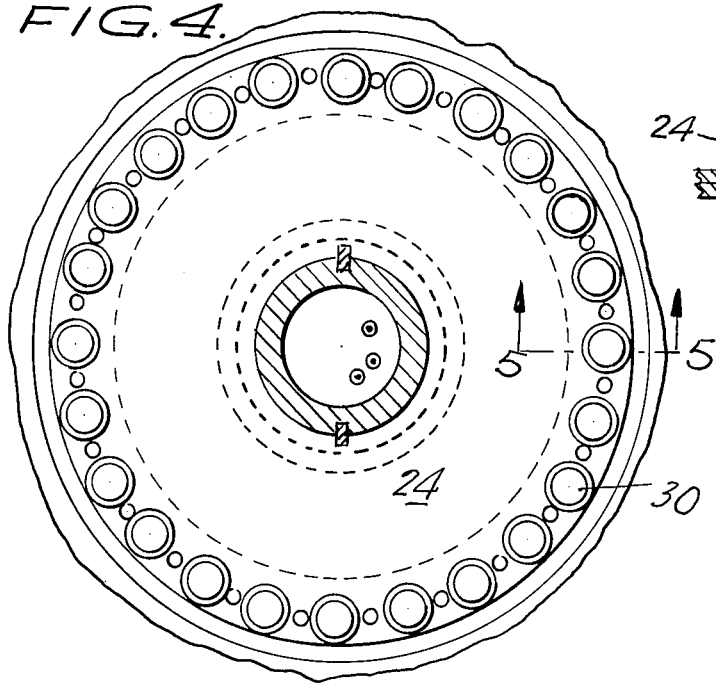
FIG. 4 is a section taken on line 4—4 of FIG. 3.
Figure 5:
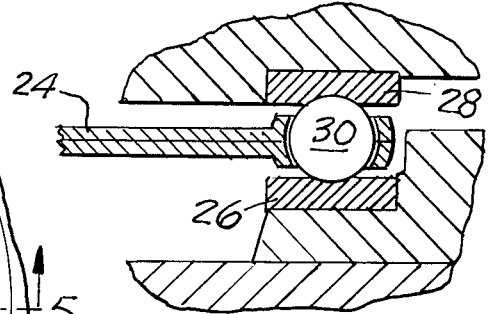
FIG. 5 is a fragmentary section taken on line 5—5 of FIG. 4.

In order that the speed of rotation of the two turbines will be the same, though in opposite directions, a synchronizer is interposed between the two. This synchronizer comprises a disc 24 forming a cage fixed to post 10. A bearing race 26 is mounted on the top of turbine B and a bearing race 28 is mounted on the lower surface of rotor 20. Bearing balls 30 are kept in position by the synchronizer disc, or cage 24. It will be understood, then, that the upper turbine A and the generator rotor 20 are positioned by bearings 12 and 14 to bear down on bearing balls 30 and the turbine B is positioned by bearings 16 and 18 so that the bearing race 26 presses against balls 30. It is seen, then, that as either turbine A or B is rotated, the other turbine B or A will be rotated at the same speed in the opposite direction of rotation. See FIGS. 3, 4 and 5.

As wind velocities vary widely it is necessary to provide an adjustment for the two turbines so that in spite of variable winds the speed of rotation of the two turbines will be kept as closely as possible to an optimum rotational speed.

As seen in FIGS. 1 and 2 the buckets of turbine A have air scoops 32 provided at the edge of each bucket at the outer extremity of the turbine. Similar air scoops 34 are positioned at the outer extremities of the buckets of turbine B. These air scoops are adjusted automatically.

Figure 7:
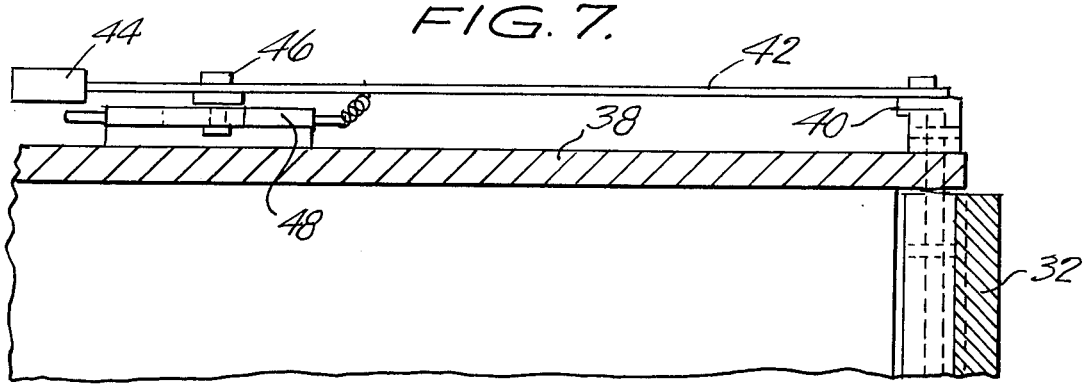
FIG. 7 is an elevation of the speed regulating means as seen in FIG. 6, the view being in the direction shown by line 7—7.
Figure 6:
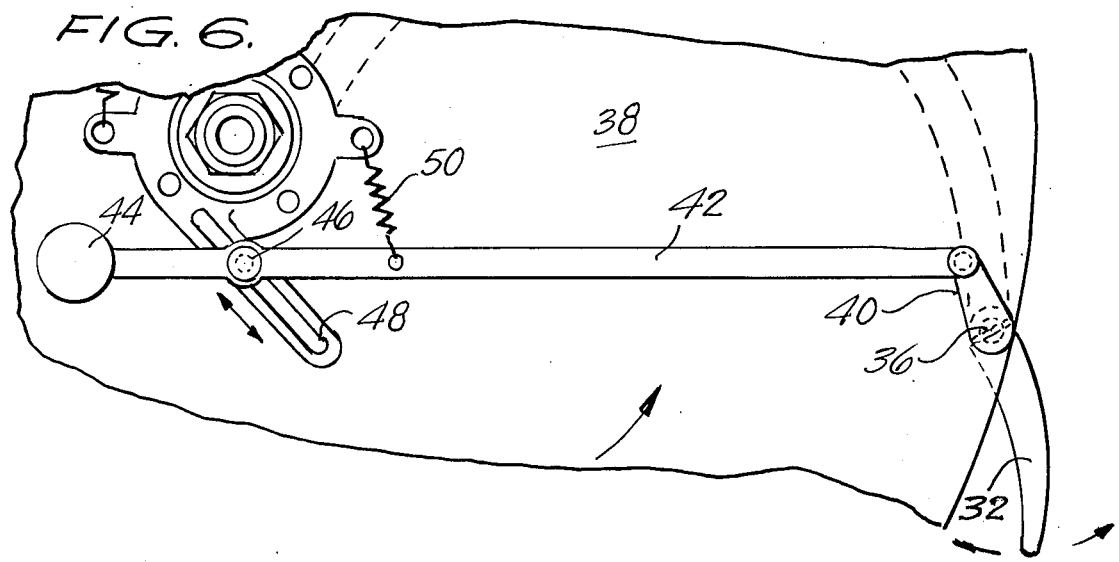
FIG. 6 is an enlarged plan view of the speed regulating means seen in FIG. 2.

From FIGS. 6 and 7 it will be seen that scoops 32, for instance, have a pin 36 extending upwardly through the disc 38 forming the upper surface of turbine A. A lever 40 is fixed to pin 36 to which an actuating bar 42 is pivoted.

At the other end of bar 42 a weight 44 is secured. A pin 46 is fixed on control bar 42 that extends into a slot in an arm 48. A spring 50 biases pin 46 along the slot in element 48 to hold the control bar 42 adjacent the center of the disc 38. Since the slot in element 48 is at an angle to the radii of the disc 38, the control bar when moved toward the center of the disc by spring 50 will be pulled in a direction away from air scoop 32, so, as the control bar is pivoted to the end of lever 40 it will pull lever 40 inwardly of the turbine so that the air scoop 32 is moved outwardly to increase the torque developed by the wind to speed up the turbine.

As the turbine increases in rotational speed the weight 44 will, by centrifugal force, pull against spring 50. As the centrifugal force overcomes spring 50 the pin 46 will move along the slot in element 48 which will cause control bar 42 to move approximately endwise to push lever 40 outwardly of the turbine which in turn moves air scoop 32 inwardly. A balance will result between the speed of the turbines and the acceleration or deceleration of the turbine. The variations of speed of the turbine will, therefore, be automatically restricted, and over speed of the turbines under heavy wind gusts will be eliminated.

As to the specific generator used it is suggested that it be a single phase 60 cycle 120 volt one, but obviously a direct current generator would be acceptable.

If the generator is of the externally excited type, the speed of the turbine could be controlled somewhat by the exciting current.

The specifics of the generator and other electrical equipment may be chosen as required for the use to which the current is to be put. The use of the current requires leads 51, 52 and 53 which lead from slip rings 54, 55 and 56 respectively down through post 10 to any convenient electrical panel. It is noted that the lead 57 from stator 22 to slip ring 56 is shown as using a brush 58 on the stator contacting a slip ring 59 on the rotor, thence to slip ring 56 on post 10.

Having thus described the preferred embodiment of the invention it should be understood that numerous structural modifications and adaptations may be resorted to without departing from the spirit of the invention.

What is claimed is:

1. A wind driven electric generating device comprising a support, a first wind driven cylindrical cage type turbine for rotation in one direction mounted on said support, a first bearing race mounted on the bottom portion of said first turbine and a second wind driven cylindrical cage type turbine for rotation in the opposite direction mounted on said support coaxially below said first turbine, a second bearing race mounted on the top portion of said second turbine, one said wind driven turbine carrying the armature of an electric generator, the other said wind driven turbine carrying the stater of said electric generator, a disc disposed on said shaft between said two turbines, and ball bearings disposed between said first bearing race and said second race and caged in by said disc to provide synchronization of rotation of said two turbines.

2. The device of claim 1 in which said two turbines are provided with air scoops at their outer periphery and means for adjusting the angle of attack of said air scoops, said last named means comprising an arm disposed on said shaft having a slot forming a trackway, a bar having a counterweight disposed at one extremity and fastened to said air scoop at its other extremity through a lever and constrained in motion by a pin on said bar which rides in said trackway of said arm, and biasing means between said arm and said bar to encourage said air scoops to a maximum attack angle relative to incident wind when the wind is blowing at a minimum.

* * * * *